MORRIS I. COHN
ROY D. PERDUE

United States Patent Office 3,783,096
Patented Jan. 1, 1974

3,783,096
METHOD OF MAKING PAPER USING A PIGMENT COMPRISING CALCIUM SULFATE PARTICLES EMBEDDED IN SILICA GEL PARTICLES
Roy D. Perdue, Andover, Mass., and Morris I. Cohn, deceased, late of Brookline, Mass., by Elliot E. Rosenberg, executor, Newtonville, Mass.; said Perdue assignor to Mica Trust, Boston, Mass.
Continuation of application Ser. No. 18,366, Mar. 12, 1970, now Patent No. 3,642,511, which is a continuation of abandoned application Ser. No. 766,453, Oct. 10, 1968. This application Jan. 14, 1971, Ser. No. 106,359
Int. Cl. D21h 3/66
U.S. Cl. 162—181 A
6 Claims

ABSTRACT OF THE DISCLOSURE

The use, as a filler or extender in paper making stock, of a pigment consisting essentially of particulate, water insoluble agglomerates of fine calcium sulfate particles embedded in finely divided silica gel particles, combined with recirculating to the process substantially all (approximately 95%) of the white water to provide a closed circuit white water system without substantial loss in sizing or deterioration of sheet strength and with excellent retention and opacity.

BRIEF SUMMARY OF THE INVENTION

This is a continuation of our application Ser. No. 18,366, now U.S. Pat. No. 3,642,511, filed Mar. 12, 1970, which, in turn, is a continuation of our application Ser. No. 766,453, filed Oct. 10, 1968, now abandoned.

The present invention relates to the use in paper making stock of a substantially water insoluble calcium sulfate-silica pigment combined with recirculating to the process the white water to provide a substantially closed circuit white water system.

In our application Ser. No. 668,267, filed July 26, 1967, now Pat. No. 3,576,657, which is a continuation-in-part of our application Ser. No. 646,950, filed June 19, 1967, now abandoned, a method is described whereby a highly water insoluble pigment may be economically prepared from wollastonite and other calcium metasilicates by the treatment of such materials with less than stoichiometric amounts of phosphoric acid. Such materials were shown to have such brightness and low abrasiveness as to make them suitable as fillers for paper and other pigment applications. Such products are of a finer average particle size and higher brightness than can be obtained by simple dry milling of wollastonite concentrates.

While the aforesaid phosphoric acid derived products are especially desirable because of their insolubility, another class of pigments which have been chemically derived from wollastonite treated with sulfuric acid also have been suggested as having utility even though they are somewhat soluble. Earlier workers have reported that the reaction products derived from wollastonite and sulfuric acid have good paper filling properties. However, these products are not only water soluble, abrasive and of only moderate brightening and opacifying power, but they also have poor retention during paper sheet formation and are not commercially practical for use in closed white water systems (systems in which the white water is recirculated) in paper mills because when so used, they result in substantial loss of sizing and deterioration of sheet strength. Accordingly, calcium sulfate alone has never found wide acceptance in paper making, as pointed out in our aforesaid pending patent application.

It is therefore an object of this invention to provide an improved and economical method of manufacture of a pigment derived from wollastonite and sulfuric acid having good opacifying properties, low abrasiveness and good retention in the sheet during paper making. It is a further object to provide such a pigment which will permit closed circuit operation of a paper making machine, i.e. recirculation of the white water, without causing loss of sizing or deterioration of sheet strength. It is a further object of this invention to provide such a pigment which enhances the mechanical properties of rubber and plastics and provides high surface hiding power in paint and similar formulations.

This is achieved in accordance with the invention by reacting an aqueous slurry of the wollastonite or other calcium metasilicate particles with sufficient sulfuric acid to form calcium sulfate particles and to solubilize at least part of the silica in the wollastonite, followed by gelating the solubilized silica, preferably by increasing the pH of the slurry, to form aggregates or agglomerates of controlled apparent particle size of the calcium sulfate particles in the silica gel.

When the wollastonite is treated with the sulfuric acid, the reaction is believed to proceed as follows, producing calcium sulfate and silica:

$$(CaO \cdot SiO_2) + H_2SO_4 \rightarrow CaSO_4 + SiO_2 \cdot H_2O$$

$$(CaO \cdot SiO_2) + H_2SO_4 + XH_2O \rightarrow$$
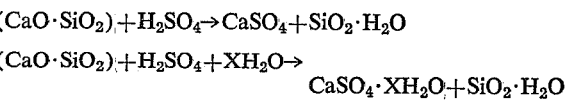
$$CaSO_4 \cdot XH_2O + SiO_2 \cdot H_2O$$

In addition to sulfuric acid, minor amounts of phosphoric acid have reportedly been used simultaneously in order to minimize the discoloration caused by iron impurities which frequently occur with the wollastonite. Such impurities when converted to ferrous and ferric phosphates are less chromophoric than the corresponding sulfates.

In our treatment of wollastonite with sulfuric acid, phorphoric acid may be added, in less than the stoichiometric quantity with which the wollastonite particles are capable of reacting, as a pretreatment rather than as a component of a mixed acid system. This pretreatment increases yield and provides a product of lower abrasiveness.

The phosphoric acid, usually in an amount of 5 to 10% of the stoichiometric requirement of the wollastonite, is added to a slurry of the wollastonite mineral particles at an elevated temperature followed by the reaction of all or a portion of the residual alkalinity of the wollastonite with sulfuric acid.

The ratio of sulfuric acid to wollastonite preferably employed results in a relatively low pH, e.g. in the range of 2 to slightly less than 4, or lower, at which at least part of the silica in the wollastonite particles is solubilized by the sulfuric acid, as aforesaid, probably as silicic acid. At these low pH's most or all of the remaining wollastonite has been reacted.

By adding alkali at the end of the sulfuric acid reaction to increase the final pH, e.g. to a value of about 4.0 or 5.0 or higher, the solubilized silica is gelated, as aforesaid, to cause a substantial thickening of the batch and to form aggregates or agglomerates of controlled apparent particle size of the calcium sulfate particles in the silica gel having low abrasiveness. Wollastonite itself can be used as the alkali and is highly preferred for accomplishing the increase in pH to gelate the silica.

The gelated slurry consists of a mixture of calcium phosphates, calcium sulfates, and silica, all hydrated to a greater or less degree, together with more or less unreacted wollastonite depending upon the ultimate design of the product. This slurry may be dewatered and dried under non-calcining conditions or may be used as is in the form of a slurry.

Insofar as we know, no one has ever applied this particular sequence of acid addition and subsequent increased pH adjustment steps in order to control abrasiveness and apparent particle size in products derived from wollastonite or other calcium metasilicates by treatment with sulfuric acid.

It has been found that this procedure creates a maximum number of tiny calcium sulfate crystals of relatively uniform size and nearly equidimensional in shape which become agglomerated by the insoluble silica gel when the pH is increased by addition of alkali. It is believed that the silica which is liberated during the initial acid attack is solubilized and is prevented from polymerizing at the low pH. As aforesaid, it is believed that such silica exists as silicic acid. As neutralization proceeds (i.e., as the pH rises) upon addition of the alkali to the acidified wollastonite, insoluble silica gel is formed and causes a binding together of the tiny calcium sulfate crystals into highly stable agglomerates of highly desirable size. In that the calcium sulfate particles can be 200 Angstrom units and smaller, it is important that these stable agglomerates be formed in order to improve the retention of the product by the paper pulp when it is used as a filler and opacifying agent in paper. However, the improvement in opacifying and hiding power created by the pigment particles in their stabilized aggregated or agglomerated condition, held together by the silica gel, is exceedingly important in paper making and paint applications.

U.S. Pats. 2,296,636; 2,296,637; 2,296,638 and 2,296,639 describe the use of a soluble silicate with a slurry of fine pigment particles. The silicate is precipitated as a silica gel on the pigment, and the resulting product is dewatered and dried at a temperature so as not to calcine the gel. In the first three patents, acid is used to precipitate the silicate. In the fourth patent, a water soluble salt of a polyvalent metal is used.

None of the above cited patents involves the acid treatment of calcium silicate to simultaneously generate substantially insoluble calcium sulfate pigment particles and a source of soluble silica which is then precipitated as an insoluble gel on the newly formed pigment particles to form agglomerates of the pigment particles in the silica gel. In none of these patents is the silica gelated by increasing the pH of an acidified wollastonite or other calcium metasilicates and in one of them is a less than stoichiometric amount of phosphoric acid used as a pretreatment followed by reaction with sulfuric acid.

The wollastonite feed for the process of the invention can be prepared from the raw ore by dry crushing and grinding to a point where liberation of magnetic and non-magetic impurities occurs. Additional steps include separation of these impurities either by the use of magnetic or specific gravity separators followed by fine grinding and classification. Removal of these impurities can also be accomplished by wet magnetic separation followed by hydroclassifiers such as cyclones and/or a solid bowl centrifuge.

After subjecting the feed to the series of acid treatment and pH increase steps described above, the products thereby obtained can be directly dewatered under non-calcining conditions and the solids resulting therefrom subjected to drying and finishing operations under non-calcining conditions. However, before such dewatering, drying and finishing operations, such products can be subjected to a high shear device, as for example, a homogenizing valve as described in our U.S. Pat. No. 3,039,703 to complete the reaction and hydration of the particles and to further reduce the abrasiveness of the product.

Furthermore, such products can be subjected to hydroclassification in order to remove residual abrasive components. For example, a hydrocyclone may be employed to furnish the desired product of low abrasiveness to the overflow and oversize abrasive particles to the underflow. The underflow fraction may be recycled to the acid reaction step or discarded depending upon the composition of the fraction. Should a high percentage of unreactive mineral component such as garnet, feldspar, or similar mineral be present, the underflow stream should be discarded.

The resulting product from our invention is therefore a mixture of crystalline and amorphous calcium phosphates, calcium sulfates, amorphous silica of various degrees of hydration and wollastonite when that mineral is used as an alkaline gelating agent to increase pH. In the latter case, the presence of alkaline wollastonite in such product under slightly acidic conditions, e.g. pH of 5, is due to its lessened reactivity as the pH rises.

The products thus obtained have utility as fillers for paper, rubber, and plastic reinforcing agents, paint pigments, and the like.

An exceedingly unique property of products made in accordance with our invention becomes apparent when they are used as paper fillers. When used as such, the white water from the paper making machine can be returned to the operation without affecting the sizing or causing deterioration in sheet strength. White water is the term applied to that water waste which is generated by every paper mill. The waste contains unretained bits of fiber, filler and dissolved solids that cause serious stream pollution problems. With conventional fillers, recirculation of substantially all of the white water or operation of the paper making equipment as a closed system with respect to water (recirculation of the white water and adding fresh water only to replace that lost in the dryer and other small unavoidable losses), is not feasible in that traditionally there is a loss of sizing and a lessening of sheet strength. The use of the products made in accordance with this invention thereby provide an opportunity to recover valuable raw materials which normally are lost and thereby lessen the growing national problem of stream pollution.

When slurries of acid resistant fillers such as titanium dioxide and clay are added to the wollastonite slurries and reacted with sulfuric acid in accordance with the present invention, with or without a phosphoric acid pretreatment, a unique mixed pigment product results. When gelation occurs (after acidification) by increase in pH followed by dewatering and drying at non-calcining temperatures, a unique state of pigment particle aggregation or agglomeration and stabilization is achieved which imparts improved opacifying and brightening power over that which can be obtained with a simple mixture of wollastonite and pigment.

U.S. Pat. 2,674,541 involves the treatment of wollastonite-titanium dioxide compositions with sulfuric acid alone or together with phosphoric acid. However, the methods and composition of matter disclosed in this patent do not involve the step of gelation after acidification. Moreover, they involve calcining the dewatered and dried product in order to destroy any gel which is formed. On the other hand, our invention is specifically directed to preserving a pigment system, stabilized and coated in small aggregates by silica gel.

DETAILED DESCRIPTION

Figure 1:
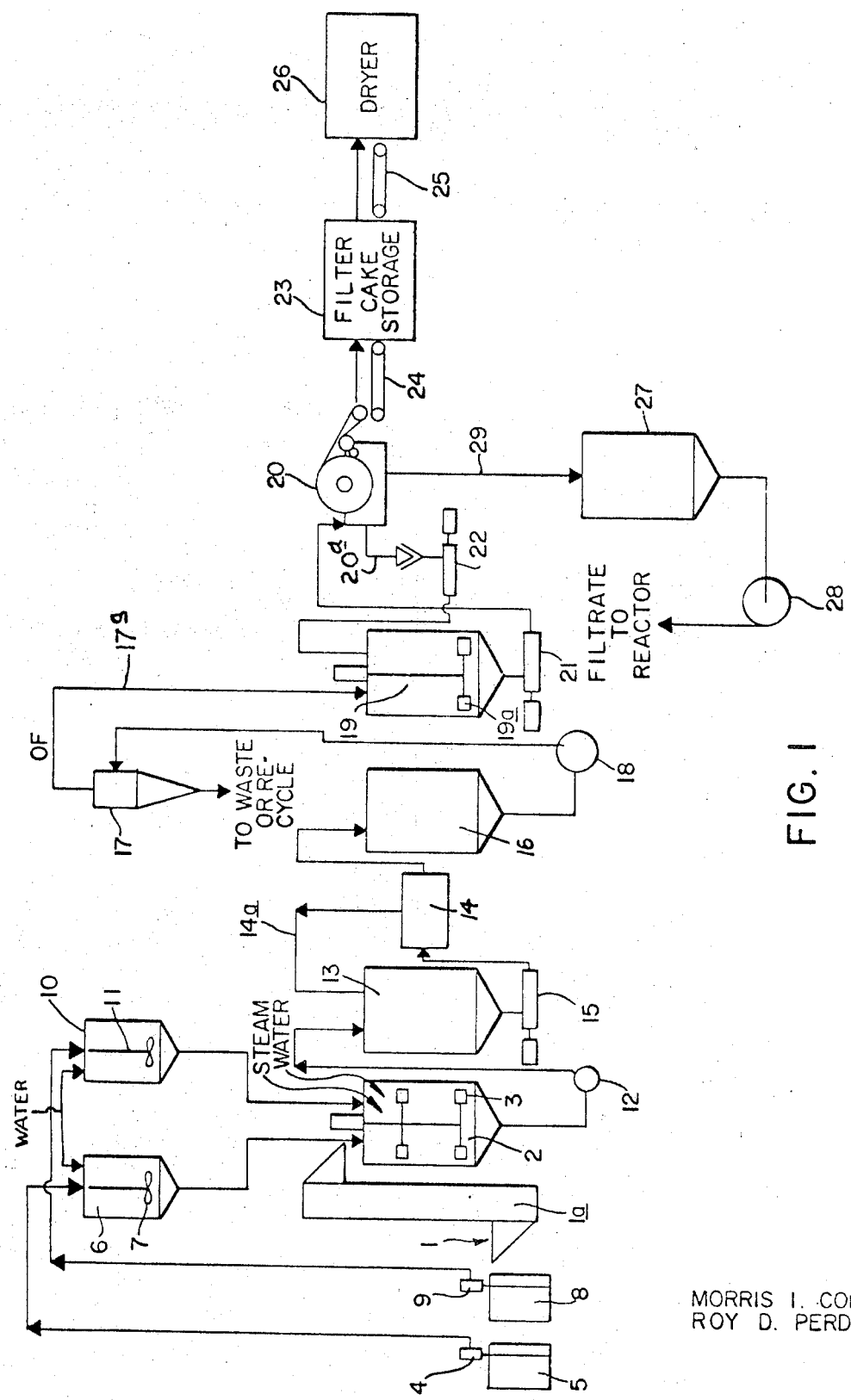
FIG. 1 represents a flow sheet for carrying out an embodiment of the method of our invention.

With reference to FIG. 1 of the drawings, wollastonite feed was charged at 1 to bucket elevator 1a which elevated and charged the feed to the reactor 2 into which a suitable amount of water had been placed. The slurry thus produced was made uniform by agitator 3. Steam or a source of external heat was applied to the reactor to raise the slurry temperature to approximately 150° F.

The wollastonite feed was furnished from a conventional dry milling flow sheet and had an average particle size of 5.7 microns passing 96.5% through a 325 mesh screen. Finer feeds can be used. The only limitation on coarser feeds is that reaction conditions as described below preferably should accomplish chemical breakdown of the coarser crystals. Such crystals provide less area per unit weight and therefore longer reaction times are involved.

Phosphoric acid was pumped via sump pump 4 from storage container 5 to the phosphoric acid dilution tank 6 fitted with agitator 7. Sufficient water was added to tank 6 prior to charging it with phosphoric acid to accomplish the desired degree of dilution. The diluted phosphoric acid was dropped by gravity from tank 6 into reactor 2 and heating and agitation allowed to continue until the pH had stabilized.

Water was placed into tank 10 and sulfuric acid from storage container 8 was pumped into the water in tank 10 using sump pump 9 while allowing agitator 11 in tank 10 to accomplish the dilution more uniformly.

After addition of the phosphoric acid to the reactor 2 from tank 6 as aforesaid, the diluted sulfuric acid in tank 10 was dropped from tank 10 into the reactor 2 where the heat of reaction and continued heating brought the contents of the reactor to nearly 212° F. Stirring and steam sparging in reactor 2 was continued until the pH ceased to rise (at first the pH dropped to a value of less than one followed by a rise in pH). The final pH tends to rise to a value of about 2.0 or 3.0 at which point some thickening commences. At this point, at least part or all of the silica in the wollastonite has been solubilized, probably in the form of silicic acid and low molecular weight polymers thereof which are soluble either as true solutions or as colloidal dispersions, by the breakdown of the wollastonite crystals by the acid.

At this point, additional alkali (lime or other alkaline material) was added whereupon substantial gel formation occurred by further polymerization and precipitation of the silica and the pH rose to 4.0 to 5.0 or higher. This neutralization (increase in pH toward neutral) and gelating step causes aggregation or agglomeration of the individual calcium sulfate particles by the silica gel to produce agglomerates of calcium sulfate particles and silica gel having highly desirable agglomerate average particle sizes (see FIG. 2). During this gel formation some advantage was gained by stopping the agitator 3 and allowing the contents of the reactor to set more firmly into the aforesaid gel structure.

Agitator 3 was then started and its action transformed the contents of reactor 2 into a gelatinous slurry, i.e., a slurry of gelatinous agglomerates of calcium sulfate and silica gel. This slurry was transferred, using pump 12, to tank 13 which is a surge tank ahead of the high shear apparatus 14.

The gelatinous slurry was transferred as shown in FIG. 1 from tank 13 to a high pressure pump and homogenizing valve (high shear apparatus) 14 by means of pump 15. In this particular instance, the high shear apparatus 14 was that which is described in our U.S. Pat. No. 3,039,703. The discharge from apparatus 14 was passed to tank 16 which is a surge tank ahead of cyclone 17. The high pressure pump 18 delivered the gelatinous slurry from tank 16 to cyclone 17 at pressures up to 100 p.s.i. Any conventional hydroclassifying equipment can be used in place of the cyclone.

The overflow from cyclone 17, containing the desired calcium sulfate-silica gel agglomerates, i.e. the product, was directed via line 17a to surge tank 19 which was equipped with agitator 19a and which served as a feed tank for filtration apparatus 20. The underflow from cyclone 17 was discarded, but a portion can be recycled to reactor 2 where it can be further reacted with the next batch.

In FIG. 1, a conventional rotary vacuum filter 20 is shown. However, a conventional filter press or conventional continuous centrifuge can also be used. The gelatinous slurry was fed from tank 19 to the dewatering filtration equipment 20 by pump 21. Where item 20 was a rotary vacuum filter, the slurry level was maintained in the chest of such filter in a conventional manner by means of a continuous overflow at 20a which was returned to tank 19 by pump 22. The dewatered filter cake was conveyed from filter 20 to filter cake storage 23 by a suitable conventional conveyor 24.

The dewatered cake from 23 was conveyed in a controlled manner by a suitable conveying device 25 to a conventional flash dryer 26 operating at a temperature below that at which the silica gel in the product is calcined, i.e. loses its chemically combined water. However, any conventional dryer capable of handling the filter cake in a batch or continuous manner may be used. An important consideration is that the drying operation should not cause calcining of the product or cause the color of the product to deteriorate. Drying temperatures of 200° F. or less are suitable.

The filtrate which was generated by the dewatering equipment 20 was passed through line 29 to a filtrate storage tank 27. Because of the sensible heat in the filtrate and of the fact that some calcium sulfate is present in it, the filtrate can be recycled to the reactor 2 as makeup water for the next batch, using pump 28, or the filtrate can be discarded.

EXAMPLE 1

A typical batch included the materials set forth in Table I below. The water charged with each material is indicated.

TABLE I

| Item number | Component | Weight (lbs.) | Water (gal.) |
| --- | --- | --- | --- |
| (1) | Finely ground (average particle size of 5-6 microns) wollastonite feed in reactor 2 before adding acid. | 32 | 36.52 |
| (2) | Phosphoric acid in tank 6 added to reactor 2 (acid added to tank 6 as a 75% solution). | [1] 1.812 | 1.5 |
| (3) | Sulfuric acid in tank 10 added to reactor 2 (acid added to tank 10 as a 93% solution). | [1] 27.63 | 8.0 |
| (4) | Alkali (finely ground wollastonite having an average particle size of 5-6 microns) added to reactor 2 in form of aqueous slurry to gelate and to increase pH. | 1-3 | 1.5 |

[1] Exclusive of water.

Referring to FIG. 1 and Table I, the water of Item (1) was charged to reactor 2 followed by charging the reactor while stirring and heating with steam with the wollastonite feed of Item (1) to form an aqueous wollastonite slurry. Filtrate from tank 27 can be used to provide part or all of the water of Item (1). Item (2) was then charged to reactor 2 after the temperature of the wollastonite slurry in such reactor had reached 150° F. to form insoluble calcium phosphate particles and to condition the wollastonite feed for further acidification by sulfuric acid. When the pH of the slurry had stabilized to a value of about 8.0 (this value can vary from 6.9 to 8.7 depending upon the amount of filtrate charged with Item (1)), Item (3) was then added to the reactor over a period of about 4 minutes. Heating and stirring were continued until the pH of the batch had stabilized at a temperature of 212° F. at a value close to 2.0. The sulfuric acid reacted with the wollastonite to form tiny calcium sulfate crystals and to solubilize at least part of the silica in the wollastonite. Item (4) was then added to reactor 2 to bring the final pH of the batch to a value of approximately 5.0. During this rise in pH from 2.0 to 5.0, polymerization with resulting gel formation or precipitation of the solubilized silica liberated from the wollastonite by the sulfuric acid takes place to form agglomerates of the calcium sulfate particles and the silica gel and the slurry thickens.

In place of wollastonite in Item (4), lime (approximately 0.6 pound) on finely ground limestone (approximately one pound) or other alkaline material can be used as an alkali for increasing pH and gelating the silica, although the use of wollastonite is highly preferred. The type of gel structure developed by each of these alternatives differs somewhat. Agitation was continued while the wollastonite or other alkali neutralizing agent was added. When thickening commenced, the agitator was stopped and the gelation process was completed under quiescence. The gelation was substantially complete after 20 to 30 minutes whereupon agitator 3 was started to break up the solid gel structure into a slurry of flowable agglomerate particles and thereby make the batch flowable. The batch was then transferred by pump 12 to tank 13. Quiescent times up to one hour have been used.

Depending upon the initial wollastonite feed, the product had an abrasion (as measured with the Valley abrasion tester, manufactured by the Allis-Chalmers Manufacturing Company, Appleton, Wis.) of 50 milligrams or higher. In the example, in which the wollastonite feed had an abrasion of 300–400 miligrams, the reaction product fed to tank 13 had an abrasion of 50 milligrams.

By passing the product slurry (12% solids by weight) via tank 13 twice (recycle for second pass at 14a in FIG. 1) through the pump and homogenizing valve 14 described in our U.S. Pat. No. 3,039,703 at a pressure of 1500 p.s.i., the abrasion of the product was reduced to 30 miligrams.

To achieve an even lower abrasion product, the entire product stream from the high shear device 14 was subjected to the action of a hydroclassifier, specifically hydrocyclone 17, via surge tank 16. Typical data from such a treatment is presented in Table II below.

TABLE II

[Typical performance of 1⅛ inch hydrocyclone 17 on the product slurry made in accordance with Table I and the foregoing description— Including treatment (two passes) in high shear device 14]

Overflow (vortex finder) diameter—0.20 inches
Underflow diameter—0.090 inches
Feed pressure—110 p.s.i.

| Stream | Solids, percent by weight | Abrasion (mgs.— Valley Abrasion tester) |
|---|---|---|
| Feed to cyclone 17 from tank 16 | 11.9 | 30 |
| Underflow | 25.3 | 314 |
| Overflow to tank 19 | 9.1 | 26.2 |

Recovery of products to overflow based on feed: 89% by weight.

An abrasion of 26.2 mg. wire loss is acceptable in most paper filler operations.

It is interesting to compare the performance (Table III below) of the same cyclone 17 used in Table II on the same batch made in the same way but without the use of phosphoric acid.

TABLE III

[Typical performance of 1⅛" hydrocyclone 17 on product slurry made without phosphoric acid]

Overflow (vortex finder) diameter—0.20"
Underflow diameter—0.090"
Feed pressure —110. p.s.i.

| Stream | Percent solids by weight | Abrasion (mgs.) |
|---|---|---|
| Feed | 11.2 | 107 |
| Underflow | 20.3 | (¹) |
| Overflow | 9.9 | 71.1 |

¹ Very high.

Recovery of product to overflow based on feed—88.5% by weight.

Comparison of the results in Tables II and III clearly establish the advantage of the phosphoric acid pretreatment in obtaining a product of lower abrasion.

The effect on an excessively abrasive reaction slurry caused by passing it through the high shear device 14, such as that described in our U.S. Pat. No. 3,039,703, was clearly shown when a 30% reaction slurry from tank 13 with initial abrasion of 335 mg. was passed twice through the device at a presure of 1500 p.s.i. The abrasion of the slurry was reduced to 252 mgs.

In general, the 1⅛" cyclone 17 provides a yield of product to the overflow of between 70 and 90% by weight based on feed to the cyclone. It is frequently advisable to discard the abrasive underflow fraction rather than to recycle it to reactor 2.

The overflow from hydrocyclone 17 was passed to tank 19 where it was held without stirring for the dewatering operation in filter 20. It is believed that excessive stirring or other unecessary mechanical handling before dewatering and drying to solidify and set the silica gel structure causes some changes to occur in the physical state of the agglomerate particles. We believe that this is due to a breakdown of the gelatinous agglomerates produced during the gelating step (addition of Item (4)) in reactor 2 described above and shown in FIG. 2.

The slurry in tank 19 was passed at a consistency of 8–12% solids to filter 20 where the solids content was raised to approximately 30–50% by weight solids. Pigments prepared in accordance with this invention have a tendency to adsorb and hold large quantities of moisture. It is, therefore, desirable that as much free water be removed from the filter cake as possible before final drying at 150° F. by passage through dryer 26 via filter cake storage 23.

As indicated above, the dryer can be any one of the several well known to those in the art so long as calcination of the silica gel in the reaction product does not occur and so long as there is a minimum of deterioration in brightness and color of the product incurred by the drying operation.

The finished product is normally sold in a non-caked, particulate state, i.e. particles of calcium sulfate-dried silica gel agglomerates. When a flash dryer is used, the product is discharged from the dryer in this form. If another form of dryer is used, a light hammer milling step to break up the dry cake may be necessary.

There are several alternates in the processing of the wollastonite slurry in reactor 2. For example, a polyphosphate, such as tetrasodiumpyrophosphate, in an amount from 0.1 to 0.5% by weight based on wollastonite feed (Item (1)), can be added to the wollastonite slurry prior to reacting it with phosphoric acid. The effect of this addition is to alter the size of the calcium sulfate particles and ultimately to affect the bulk density of the product.

Figure 2:
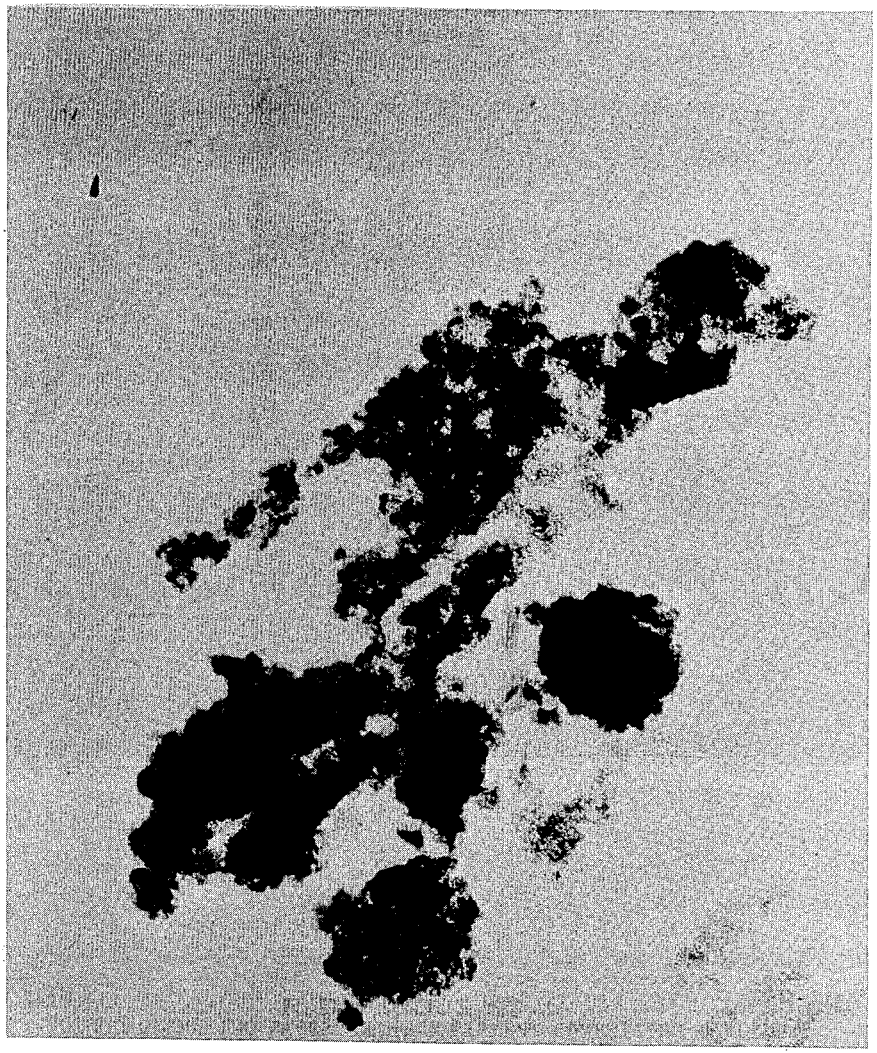
FIG. 2 is an electron photomicrograph of the reaction product of the invention made in accordance with the flow sheet of FIG. 1.

As indicated in FIG. 2, which is an electron photomicrograph (magnification of 50,000 times so that 5 centimeters equal 1 micron) of the product of the aforesaid example obtained from dryer 26 in FIG. 1, the ultimate particle size of the calcium sulfate particles (crystals) in such product may be as small as 200° A, but the effective average "particle size" of the product due to the agglomerating effect of the amorphous silica gel, i.e., the average particle size of the calcium sulfate-silica gel agglomerates, makes the product behave as if it had an average particle size in the range of 0.1–2.0 microns, which was the average particle size of the calcium sulfate-silica gel agglomerates. Such agglomerate average particle size may vary between 0.1 to 5.0 or 6.0 microns and smaller. Also, in FIG. 2, there is shown a small percentage of unreacted wollastonite crystals, which are the lath-like elongated particles in the figure and which are believed to be derived from the wollastonite added as an alkali in the gelating step. The bulk density of the product was 16 lbs./ft.³ and its brightness was 96 as measured on the Photovolt Reflection Meter No. 670.

The unusually high opacifying power of pigments made in accordance with this invention is demonstrated in Table IV below where a pigment made in accordance with Example 1 is compared with Zeolex 23P [1] as an extender for TiO$_2$.

TABLE IV

[Comparison of pigment of Example 1 with Zeolex 23P as an extender of filler for TiO$_2$ when making a conventional 20 lb. (17 × 22—500) sheet from 60% hardwood and 40% softwood bleached Kraft pulp]

| Filler/TiO$_2$ ratio | ⅓ Zeolex 23P, ⅓ TiO$^2$ | ⅔ pigment of example — TiO$_2$ |
|---|---|---|
| Grams filler in sheet per gm. fiber | 0.0326 | 0.0218 |
| Currier size (seconds) | 21.4 | 28.6 |
| Brightness (photovolt) | 82.6 | 82.5 |
| Opacity (Bausch and Lomb) | 87.0 | 88.5 |

From Table IV it can be seen that with substantially less filler per grams of fiber, i.e., 33% less, sizing, brightness, and opacity are comparable or better than the competitive commercial product (in the Currier size test the longer time indicates better resistance to ink penetration.)

When the pigment made in accordance with the aforesaid example of this invention was used exclusively in filling a bleached kraft sheet, using essentially the same ratio of hardwood and softwood pulps, and approximately 95% of the white water recirculated to the process, a 96 hour run was completed with no salt or dissolved solids build-up. The pigment was used at a concentration of 8% on the weight of the fiber. The alum requirement was normal and there was no traditional loss of sizing or deterioration of sheet strength which is always encountered when such water recirculation or "closed circuit operation" has been attempted before with existing commercial fillers. Since white water always contains tiny bits of pulp (fiber), filler, and dissolved salts, the reuse of this heretofore considered waste stream represents both an economic saving and the elimination of a serious waste disposal problem.

We have found the pigments made in accordance with the foregoing disclosure suitable for use in rubber both as an extender, as a processing aid in producing smoother extrusions, and as a reinforcing agent both in natural and synthetic rubber.

The wollastonite feed may have admixed therewith other acid resistant mineral pigments, e.g. from 0.5 to 80 or 90% based on weight of wollastonite, such as clay, TiO$_2$, insoluble silicates such as magnesium and calcium orthosilicate, silicas, etc., both white and chromophoric. The uncalcined gel-like structure stabilizing the mixed pigment systems is useful in producing greater opacity and surface hiding power than can be achieved by simply mixing the pigments physically without the use of chemical reaction.

The methods taught in U.S. Pat. No. 2,686,731 are directed to treating wollastonite with hydrochloric and nitric acids which do not produce insoluble calcium salts. Moreover, the silica sols, gels and mixed pigment (metal hydrates) particles which result have ultrafine particle size.

The minimum solids concentration of the wollastonite feed to the reactor is limtied only by economic use of existing equipment and the maximum solids concentration is limited to that which can be efficiently agitated and transferred during the various steps of the process. Solids concentrations of the wollastonite feed as low as 5% and as high as 30% have been used. If exceedingly powerful agitation is used, higher solids concentrations can be used. However, the preferred solids concentration of the initial wollastonite feed is between 10 and 15%.

The minimum average particle size of the wollastonite is the smallest particle size which can be produced and is limited only by the fact that exceedingly small particle sizes are expensive to produce. The maximum particle size is dictated only by that size at which a reasonably pure concentrate of wollastonite can be produced from the ore deposit. Normally, the maximum particle size which can be obtained relatively free of undesirable impurities, i.e. reasonably pure wollastonite, is in the range of 20 to 40 mesh. Wollastonite, particle sizes between 1 micron and that held by a standard 200 mesh screen have been used. A wollastonite feed particle size of between 3 and 10 microns is preferred.

The range of particle size of the wollastonite used as an alkali to gelate the silica are the same as the wollastonite feed although finer particle sizes are preferred for this step.

The concentration of phosphoric acid in water fed to the reactor is not critical. The total amount of phosphoric acid added to the reactor may vary from 2 or 3% of the stoichiometric amount required to react with all the wollastonite to as high as 30% or 40% and even higher so long as it is substantially less than the stoichiometric amount so that some, preferably the major portion, of the wollastonite is available to react with the sulfuric acid. In fact, the phosphoric acid can be omitted entirely if one is willing to sacrifice the improvement in abrasion achieved thereby and when it is used, it is preferable that the amount not exceed 10% of the stoichiometric amount.

The concentration of sulfuric acid fed to the reactor is not critical either, keeping in mind that the more dilute the concentration the greater the sacrifice in capacity. Concentrations between 20 and 50%, have been used. The total amount of sulfuric acid added should be enough to achieve a final pH low enough, less than 4.0 and usually 2.0 or 3.0 or less, to solubilize at least a substantial amount of the silica in the available wollastonite and preferably all of it. The amount of sulfuric acid may be in excess of that required to react with all of the available wollastonite and to lower the pH to 2.0 or 3.0. However, when it is remembered that an excess of sulfuric acid will require more alkali addition to raise the pH to gelate the silica, such an excess is uneconomical. As aforesaid, preferably, an amount of sulfuric acid is used which will react with all of the available wollastonite and to provide the aforesaid pH of less than 4.0 and usually 2 or 3 less less The solids concentration of the slurry fed to the high shear device 14 may vary over a wide range so long as the slurry is sufficiently flowable. Concentrations between 5 and 30% by weight have been used.

The solids concentration of the slurry fed to the hydrocyclone 17 should be low enough for efficient separation in the cyclone. Concentrations between 1 and 20% have been used. Concentrations of from 10 to 15% are preferred.

The amount of alkali required is that necessary to raise the pH to that at which the solubilized silica is gelated, usually 4.0 or 5.0. A greater amount of alkali can be used to increase the pH to 7.0 or 8.0 or more but this is not always necessary in that for paper, most systems operate with a slightly acidic furnish to the paper making machine. When wollastonite is used to increase pH, the higher the pH the more the unreacted wollastonite in the final product, which may raise the abrasion unduly. On the other hand, a small amount of wollastonite in the final product achieved by adding enough to raise the pH to about 4.0 or 5.0 and a maximum of 6.0 is beneficial since its lathe-like structure aids in retention of the product and other fillers in making the paper sheet. Preferably the amount of unreacted wollastonite in the final product is betwen 1 and 3% by weight.

It is possible to gelate the silica by other means, including dilution of the acidified wollastonite with water. However, these have serious disadvantages so that they are not preferred.

The high shear device 14 and/or the cyclone 17 can be omitted altogether but the use of both is highly preferred to reduce abrasion and in the case of the shear device to also complete reaction and hydration.

When using the high shear pump and homogenizing valve 14, the final state of aggregation and average ag-

---

[1] A sodium silico-aluminate manufactured by the J. M. Huber Corporation, Havre de Grace, Md.

glomerate particle size is controlled by the pressure, pumping rate, and valve dimensions, as indicated in our U.S. Pat. No. 3,039,703.

When the high shear device is not used, reproducibility of the agglomerate particle size is controlled by standardizing on time and intensity of agitation after the gelating step.

It is not intended that the invention be limited by any theory set forth in the above description or to or by the aforesaid example but only to the methods and products claimed below and their equivalents.

We claim:

1. In a method of making paper comprising preparing a paper stock and passing it to and through a paper forming station to remove water and form a paper web, said water comprising white water, the improvement comprising adding to said paper stock a particulate pigment comprising agglomerates of calcium sulfate particles in silica gel particles, the agglomerate particle size of said silica gel particles being substantially greater than the particle size of said calcium sulfate particles contained therein to provide an average agglomerate particle size of about 0.1 micron or greater, and recycling the white water back to the paper stock makeup to provide a substantially closed recycle system without deleteriously affecting paper quality, said agglomerate particles being made by reacting a slurry of calcium metasilicate particles with sufficient sulfuric acid to form said calcium sulfate particles and to reduce the pH of the reaction mass to a pH at which silica released from said calcium metasilicate is dissolved as silicic acid in the reaction mass followed by increasing the pH of the reaction mass and gelating said dissolved silica into a silica gel in which said calcium sulfate particles are dispersed and dividing said silica gel into said silica gel agglomerate particles containing said smaller calcium sulfate particles, said method including adding said agglomerate particles to said paper stock while said silica is in the form of a substantially non-calcined gel.

2. In a method according to claim 1, said pigment comprising particulate agglomerates of calcium sulfate particles and calcium metasilicate particles in silica gel particles.

3. In a method according to claim 2, said metasilicate particles being wollastonite.

4. In a method according to claim 2, said pigment consisting essentially of particulate agglomerates of calcium sulfate particles, calcium phosphate particles and calcium metasilicate particles in silica gel particles wherein said calcium phosphate particles are produced by reacting said slurry of calcium metasilicate particles with between 2 and 40 percent of stoichiometric quantities of phosphoric acid to form said calcium phosphate particles before reaction with said sulfuric acid.

5. A method according to claim 1, said pigment particles having an average particle size of between 0.1 and 6 microns.

6. A method according to claim 1, said calcium metasilicate being wollastonite.

References Cited

UNITED STATES PATENTS

| | | | |
|---|---|---|---|
| 2,686,731 | 8/1954 | Wainer | 106—306 |
| 2,905,567 | 9/1959 | Allen | 106—306 X |
| 3,642,511 | 2/1972 | Cohn | 106—306 |
| 2,067,876 | 1/1937 | Campbell | 162—190 |
| 2,711,371 | 6/1955 | Lurie | 162—190 |
| 3,067,087 | 12/1962 | Gorski et al. | 162—190 |
| 3,250,667 | 5/1966 | Legator | 162—190 |

FOREIGN PATENTS

| | | | |
|---|---|---|---|
| 680,116 | 2/1964 | Canada | 106—306 |

S. LEON BASHORE, Primary Examiner

F. FREI, Assistant Examiner

U.S. Cl. X.R.

162—181 C, 190